US007886961B2

(12) United States Patent
Dabrowski

(10) Patent No.: US 7,886,961 B2
(45) Date of Patent: Feb. 15, 2011

(54) METHOD AND APPARATUS FOR LOW COST CONCURRENT PROVISION OF GAMING MACHINE TOKEN REDEMPTION AND ATM SERVICES

(76) Inventor: Stanley P. Dabrowski, 2801 Deep Water Cir., Las Vegas, NV (US) 89117

(*) Notice: Subject to any disclaimer, the term of this patent is extended or adjusted under 35 U.S.C. 154(b) by 1105 days.

(21) Appl. No.: 11/409,159

(22) Filed: Apr. 21, 2006

(65) Prior Publication Data

US 2007/0246531 A1 Oct. 25, 2007

(51) Int. Cl.
*G06F 17/60* (2006.01)

(52) U.S. Cl. ...................................... 235/379; 235/380

(58) Field of Classification Search ................. 235/379, 235/380, 376; 705/35, 39, 42
See application file for complete search history.

(56) References Cited

U.S. PATENT DOCUMENTS

| | | | |
|---|---|---|---|
| 4,880,237 | A | 11/1989 | Kishishita |
| 5,179,317 | A | 1/1993 | Watanabe et al. |
| 5,239,165 | A | 8/1993 | Novak |
| 5,251,738 | A | 10/1993 | Dabrowski |
| 5,265,874 | A | 11/1993 | Dickinson et al. |
| 5,290,033 | A | 3/1994 | Bittner et al. |
| 5,371,345 | A | 12/1994 | LeStrange et al. |
| 5,420,406 | A | 5/1995 | Izawa et al. |
| 5,470,079 | A | 11/1995 | LeStrange et al. |
| 5,544,728 | A | 8/1996 | Dabrowski |
| 5,557,086 | A | 9/1996 | Schulze et al. |
| 5,577,959 | A | 11/1996 | Takemoto et al. |
| 5,580,311 | A | 12/1996 | Haste, III |
| 5,595,538 | A | 1/1997 | Haste, III |
| 5,627,356 | A | 5/1997 | Takemoto et al. |
| 5,709,603 | A | 1/1998 | Kaye |
| 5,764,789 | A | 6/1998 | Pare et al. |
| 5,772,510 | A | 6/1998 | Roberts |
| 5,791,990 | A | 8/1998 | Schroeder et al. |
| 5,818,026 | A | 10/1998 | Melling et al. |
| 5,833,540 | A | 11/1998 | Miodunski et al. |
| 5,902,983 | A | 5/1999 | Crevelt et al. |
| 5,915,588 | A | 6/1999 | Stoken et al. |
| 6,012,832 | A | 1/2000 | Saunders et al. |
| 6,014,594 | A | 1/2000 | Heidel et al. |
| 6,048,269 | A | 4/2000 | Burns et al. |

(Continued)

FOREIGN PATENT DOCUMENTS

| | | |
|---|---|---|
| WO | WO 9416781 | 4/1994 |

(Continued)

*Primary Examiner*—Daniel St.Cyr
(74) *Attorney, Agent, or Firm*—Gates & Cooper LLP

(57) ABSTRACT

A method and apparatus for concurrently providing automatic teller machine (ATM) and gaming machine token redemption services is disclosed. In one embodiment, the apparatus comprises a token redemption surface having a token redemption user interface including a token acceptor for accepting tokens representing gaming machine redemption values, an ATM surface, having an ATM user interface, a bill dispenser disposed between the token redemption surface and the ATM surface, the bill dispenser having a first dispensing port adjacent the token redemption surface and a second dispensing port adjacent the ATM surface, and a processor, communicatively coupled to the token acceptor and the bill dispensing device, the processor for accepting signals from the token acceptor and for commanding the bill dispenser to dispense bills via the first dispensing port according to the gaming machine redemption values.

24 Claims, 6 Drawing Sheets

U.S. PATENT DOCUMENTS

| | | | | |
|---|---|---|---|---|
| 6,056,289 | A | 5/2000 | Clapper, Jr. | |
| 6,110,044 | A | 8/2000 | Stern | |
| 6,113,492 | A | 9/2000 | Walker et al. | |
| 6,128,550 | A | 10/2000 | Heidel et al. | |
| 6,170,744 | B1 | 1/2001 | Lee et al. | |
| 6,253,119 | B1 | 6/2001 | Dabrowski | |
| 6,263,246 | B1 | 7/2001 | Goedeke et al. | |
| 6,263,258 | B1 | 7/2001 | Dabrowski | |
| 6,280,326 | B1 | 8/2001 | Saunders | |
| 6,340,331 | B1 | 1/2002 | Saunders et al. | |
| 6,379,246 | B1 | 4/2002 | Dabrowski | |
| 6,547,664 | B2 | 4/2003 | Saunders | |
| 6,558,256 | B1 | 5/2003 | Saunders | |
| 6,598,788 | B1 | 7/2003 | Dabrowski | |
| 6,598,798 | B1 | 7/2003 | Kashi et al. | |
| 6,612,926 | B1 | 9/2003 | Dabrowski | |
| 6,612,928 | B1 | 9/2003 | Bradford et al. | |
| 6,623,357 | B2 | 9/2003 | Chowdhury | |
| 6,650,427 | B2 | 11/2003 | Brooks et al. | |
| 6,763,998 | B1 | 7/2004 | Miodunski et al. | |
| 6,834,794 | B2 | 12/2004 | Dabrowski | |
| 6,896,180 | B2 | 5/2005 | Miodunski et al. | |
| 7,107,245 | B1 | 9/2006 | Kowalick | |
| 7,147,558 | B2 | 12/2006 | Giobbi | |
| 7,324,973 | B2 | 1/2008 | Taylor, III | |
| 7,416,112 | B2 * | 8/2008 | Smith et al. | 235/379 |
| 2002/0045477 | A1 | 4/2002 | Dabrowski | |
| 2002/0160832 | A1 | 10/2002 | Burns et al. | |
| 2003/0166412 | A1 | 9/2003 | Marcu | |
| 2003/0171145 | A1 | 9/2003 | Rowe | |
| 2005/0003889 | A1 | 1/2005 | Dabrowski | |
| 2006/0046842 | A1 | 3/2006 | Mattice et al. | |
| 2007/0181676 | A1 * | 8/2007 | Mateen et al. | 235/381 |

FOREIGN PATENT DOCUMENTS

| | | |
|---|---|---|
| WO | WO98/59311 | 12/1998 |
| WO | WO 9859311 | 12/1998 |
| WO | WO99/22350 | 5/1999 |

* cited by examiner

METHOD AND APPARATUS FOR LOW COST CONCURRENT PROVISION OF GAMING MACHINE TOKEN REDEMPTION AND ATM SERVICES

BACKGROUND OF THE INVENTION

1. Field of the Invention

The present invention relates to gaming systems and methods, and in particular to a system and method for concurrently providing ATM gaming machine token redemption services at reduced cost.

2. Description of the Related Art

Increasingly, gaming machines pay out winnings and accept wagers in the form of cashless tokens. Such tokens can include printed tickets, smart cards, magnetic striped cards, flash memories, and the like. Such systems typically operate by storing some representation of a gaming machine cash-out value (or cash-in value) on the token. The player can then take the token to a second gaming device, and use the token to transfer game credits or other value to the second gaming device. The player can also use the token to obtain cash for their game credits. The payment of this cash-out can be awarded by a cashier upon presentation of the token, or by player application of the token to a cashierless redemption kiosk. Exemplary token systems are disclosed in U.S. Pat. Nos. 6,834,794; 6,612,926; 6,598,798; 6,379,246; 6,263,258; 6,253,119; 6,280,326; 6,048,269; 6,012,832; and 5,290,033, and in pending patent application Ser. No. 10/893,786, entitled "METHOD AND APPARATUS FOR SCRIP DISTRIBUTION AND MANAGEMENT PERMITTING REDISTRIBUTION OF ISSUED SCRIP", currently published as publication number US-2005-0003889-A1, all of which are hereby incorporated by reference herein.

There are several problems associated with such kiosks. One problem is cost. Each kiosk must have a bill dispenser, and bill dispensers are expensive. Another problem is maintenance. Since the redemption kiosks dispense (and may accept) cash, they must be periodically replenished or emptied of cash. This maintenance can be expensive and involves security risks as well.

At the same time, banks and other financial institutions are increasingly placing automatic teller machines (ATMs) in and around casinos. These ATMs allow players to withdraw money from their accounts for gaming purposes, and to deposit any winnings. Banks are willing to install such ATMs in casinos as a convenience to customers, as an enticement to potentially new customers, and to generate income from transaction fees charged to players who are not bank customers.

It would be advantageous to utilize the bill accepting and bill dispensing functionality provided by an ATM to support token redemption functions as well. Unfortunately, while it is possible to modify an ATM machine to accept and process redemption tokens, the inherent differences between ATM customer needs and gaming customer needs makes this a difficult proposition.

Typically, gaming token redemption can be completed quite rapidly. All that is necessary is for the player to provide the token to a suitable interface, optionally enter information via a card or a keypad, and to receive their cash. This sort of transaction can be completed in less than a minute.

Conversely, ATMs offer a wide range of services to their customers, including account inquiries, transfers, withdrawals, and deposits. Many customers perform multiple transactions in a single session. For these reasons, the mean total transaction time for ATM customers is much greater than the mean total transaction time for gaming machine players. If token redemption functionality were offered in ATMs, gaming machine customers may be asked to wait lines made excessively long by ATM customers completing lengthy transactions. Furthermore, the ATM customers themselves will find their wait increase as gaming customers use the ATM to redeem their tokens.

What is needed is an way to combine ATM functionality and gaming token redemption functionality that is both (1) inexpensive and (2) does not substantially increase the queues for redeeming gaming tokens or performing ATM transactions. The present invention satisfies that need.

SUMMARY OF THE INVENTION

To address the requirements described above, the present invention discloses a method, apparatus for concurrently providing automatic teller machine (ATM) and gaming machine token redemption services. In one embodiment, the apparatus comprises a token redemption surface having a token redemption user interface including a token acceptor for accepting tokens representing gaming machine redemption values, an ATM surface, having an ATM user interface, a bill dispenser disposed between the token redemption surface and the ATM surface, the bill dispenser having a first dispensing port adjacent the token redemption surface and a second dispensing port adjacent the ATM surface, and a processor, communicatively coupled to the token acceptor and the bill dispensing device, the processor for accepting signals from the token acceptor and for commanding the bill dispenser to dispense bills via the first dispensing port according to the gaming machine redemption values. The invention is also embodied in a method comprising the steps of concurrently accepting a gaming machine token representing a gaming machine redemption value in a token redemption user interface from a first user and ATM commands in an ATM user interface from a second user; and commanding a bill dispenser to selectively dispense bills to the first user from a first dispensing port adjacent the token redemption user interface according to the redemption value and to the second user from a second dispensing port adjacent the ATM user interface according to the ATM commands.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
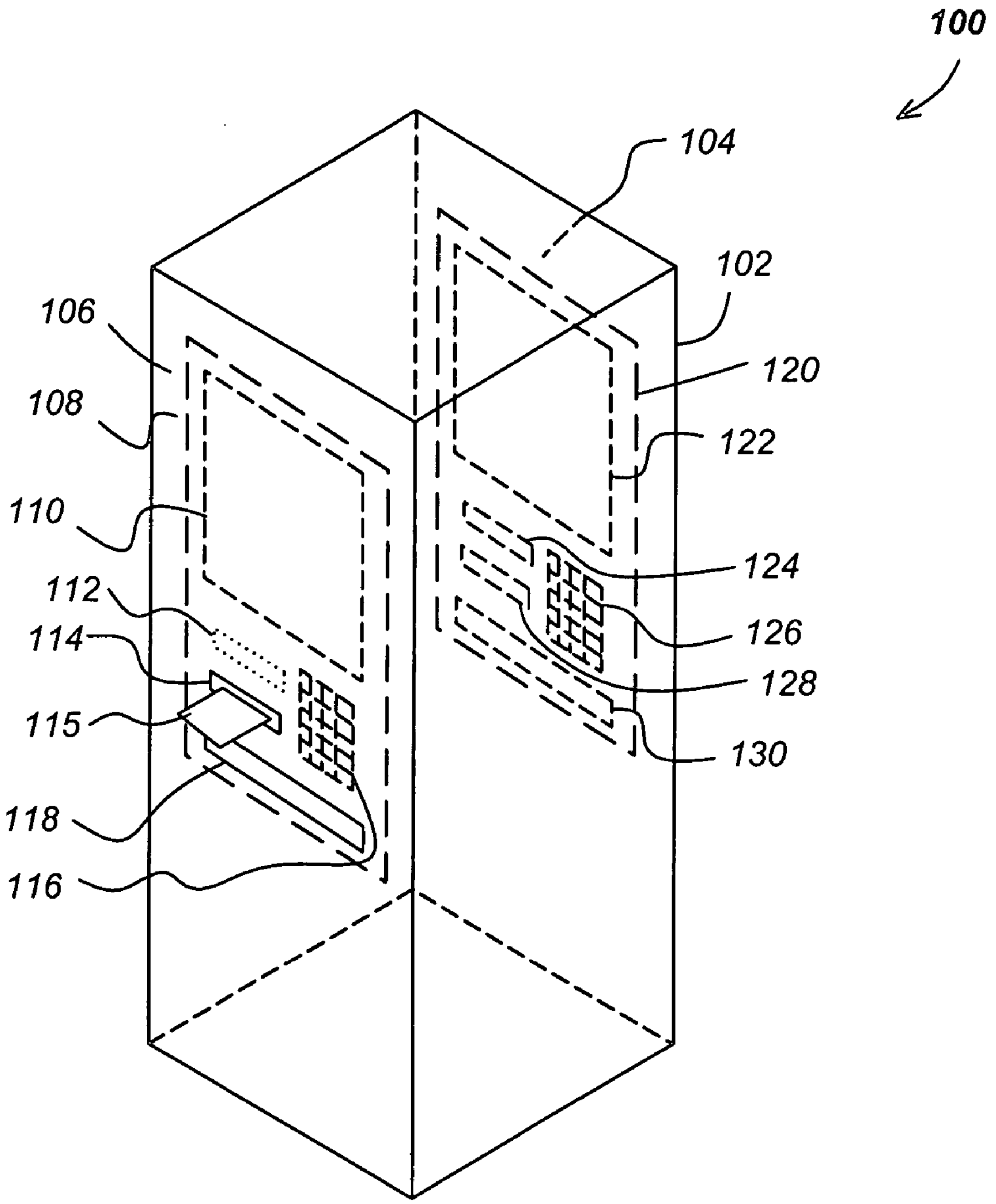
FIGS. 1A and 1B are diagrams of one embodiment of a token redemption/ATM station.
Figure 1B:
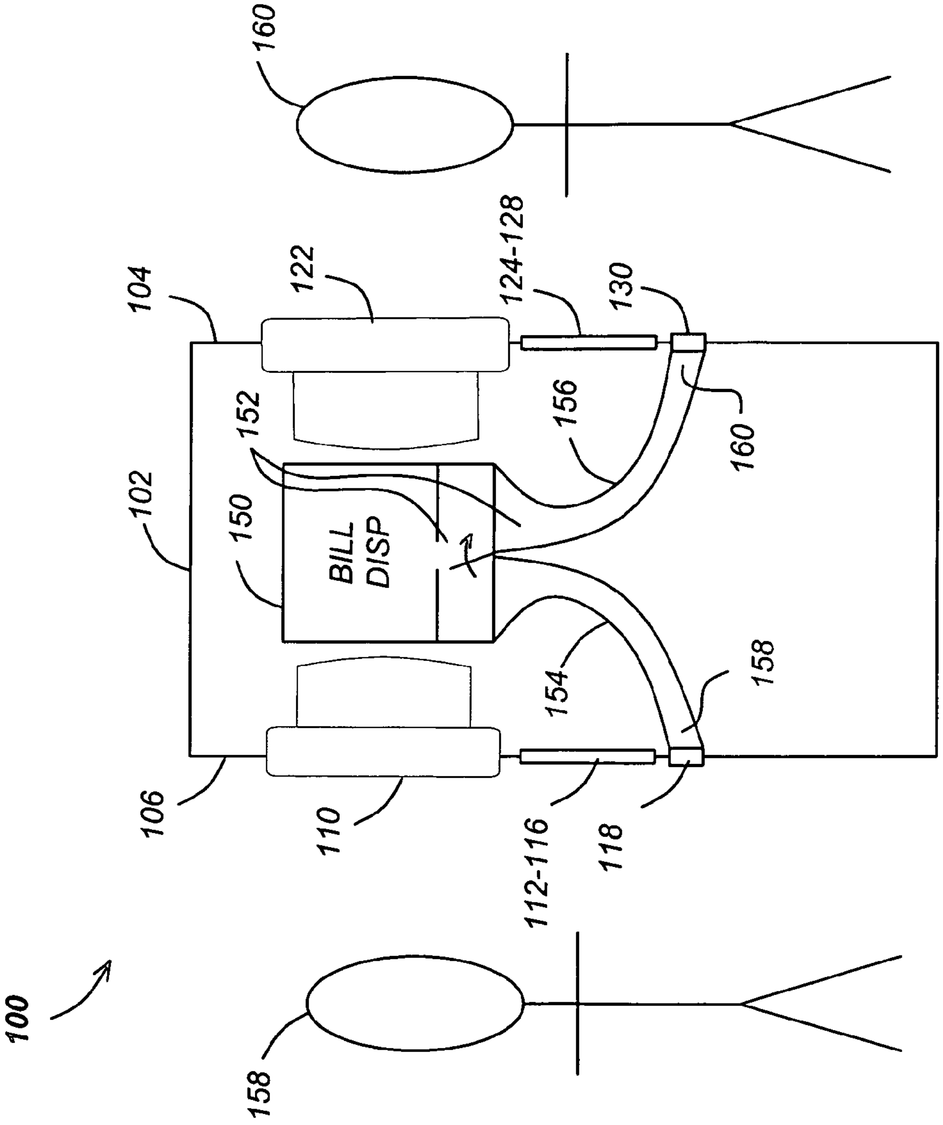

FIGS. 1A and 1B are diagrams of one embodiment of a token redemption/ATM station (TRAS) 100. FIG. 1A is a perspective view of the TRAS 100. Here, the TRAS 100 is embodied in a kiosk 102. A token redemption surface 104 of the kiosk 102 includes a gaming token redemption user interface 108, and an ATM surface 106 of the kiosk 102 includes an ATM user interface 106.

The gaming token redemption interface 108 includes one or more token acceptor(s) 114, and a bill dispensing aperture 118. The gaming token redemption interface 108 may also optionally include a display 110, an input device 116 such as a keyboard or keypad, and an output device 112 for providing coupons, gaming tokens, and receipts. The output device 112 may dispense pre-printed items or may print them internally.

The form of the token acceptor(s) 114 depends upon the form of token(s) 115 that are used in the gaming system. Such token(s) 115 can take the form of a printed ticket, a magnetic card, a smart card, a flash memory, a radio frequency identifier (RFID) tagged device, or any other device capable of carrying information that can be read by the associated one or more token acceptor (s) used in the redemption interface 108.

RFID is a wireless data collection technology that uses electronic tags for storing data that can be used to identify items. A physical connection between the token and the token acceptor is not required, since RFID tags can be read when they are within the proximity of a transmitted radio signal. RFID tags hold more data than typical bar codes, and can therefore be used for tracking individual items. RFID devices can be embedded in exchange media such as gaming chips. Such chips can be accepted by a token acceptor 114 that includes a slot (similar to a vending machine or public telephone coin slot) opening to a chute that passes the RFID device close enough to an RFID sensing device to read the RFID tags.

The use of multiple token acceptors 114 permits a user to redeem multiple token types in a single visit to the TRAS 100. For example, in embodiments of the TRAS 100 which include token acceptors 114 in the form of a smart card reader, a printed ticket reader, and an RFID device, the user may redeem all of these token types at the same TRAS 1000 and in the same session.

For gaming systems that use printed tokens, the token acceptor 114 is a device which accepts and scans the printed (and optionally, other) information on the printed token. For gaming systems using magnetic cards, the token acceptor 114 is a magnetic card reader (and optionally, a card writer). For gaming systems using smart cards, the token acceptor 114 is a smart card reader (and optionally, writer). For gaming systems using solid state memory tokens, the token acceptor 114 may be a simple electromechanical connector, such as a universal serial bus (USB) plug. In all of the above cases, the token 115 has information that includes some representation of gaming machine redemption values. In the case of a printed token, it may take the form of a bar code (which may be encrypted as well). In the case of a magnetic card, the redemption value may be manifested is manifested in the magnetic strip. And in the case of a smart card or solid state memory token, the redemption value is represented by bits stored in the data stored in the memory.

The ATM user interface 120 includes a display 122, an user input device 126 such as a keyboard or keypad, an ATM output device 124 for providing receipts and transaction records, an ATM input device 128 for accepting ATM cards, smart cards, or portable flash memory and the like, a transaction input device 125 and an ATM bill dispensing aperture 130.

In the illustrated embodiment, the kiosk 102 is has a rectangular cross section with a plurality of side surfaces, and the gaming token redemption interface 108 is disposed on a diametrically opposing side from the ATM user interface 120. This arrangement is preferred because it permits customers to queue on either side of the kiosk 104, because it shields ATM transactions from gaming token transactions, and because it permits the use of a particular configuration of commercial off-the-shelf (COTS) bill dispensers 150.

Bill dispensers are typically built in one of four configurations: (1) front loading and rear dispensing, (2) rear loading and rear dispensing, (3) front loading and rear dispensing, and (4) rear loading and front dispensing. The installer chooses a bill dispenser of the configuration for the particular application, and once installed, bills are accepted and dispensed in only one direction. For example, an installer may choose a rear loading and front dispensing bill dispenser for a drive up teller application.

To reduce logistical and manufacturing costs, bill dispenser manufacturers have developed devices that allow one device to dispense bills in one direction or another. This permits the manufacturer to offer one device that can be used in any one of the four above configurations, thus saving the cost of maintaining multiple replacement part sets, and allowing users to re-use bill dispensers in different installations. In such installations, the installer sets the direction that the bills are dispensed set in the bill dispenser's software upon installation, and the value remains set so long as the bill dispenser remains in that installation.

While such bill dispensers 150 are not known to be used to selectively dispense bills in one direction or the other after installation, they can be modified to do so by application of appropriate computer commands. When so modified, such bill dispensers are particularly useful in the TRAS 100.

FIG. 1B is a diagram illustrating a side view and some internal components of one embodiment of the TRAS 100. The TRAS 100 includes a bill dispenser 150 having a bill routing system (BRS) or router 152. In this embodiment, the BRS 152 is functionally depicted as an aperture with a door that swings to selectively direct the bills toward either a first dispensing chute 154 or a second dispensing chute 156 (which direct the dispensed bills to a first dispensing port 158 proximate the bill dispensing aperture 118 or the second dispensing port 160 proximate the ATM bill dispensing aperture 130). As shown, the gaming token redemption interface 108 is presented to and used by the first user 158, and the ATM user interface is presented to and used by the second user 160.

Figure 2A:
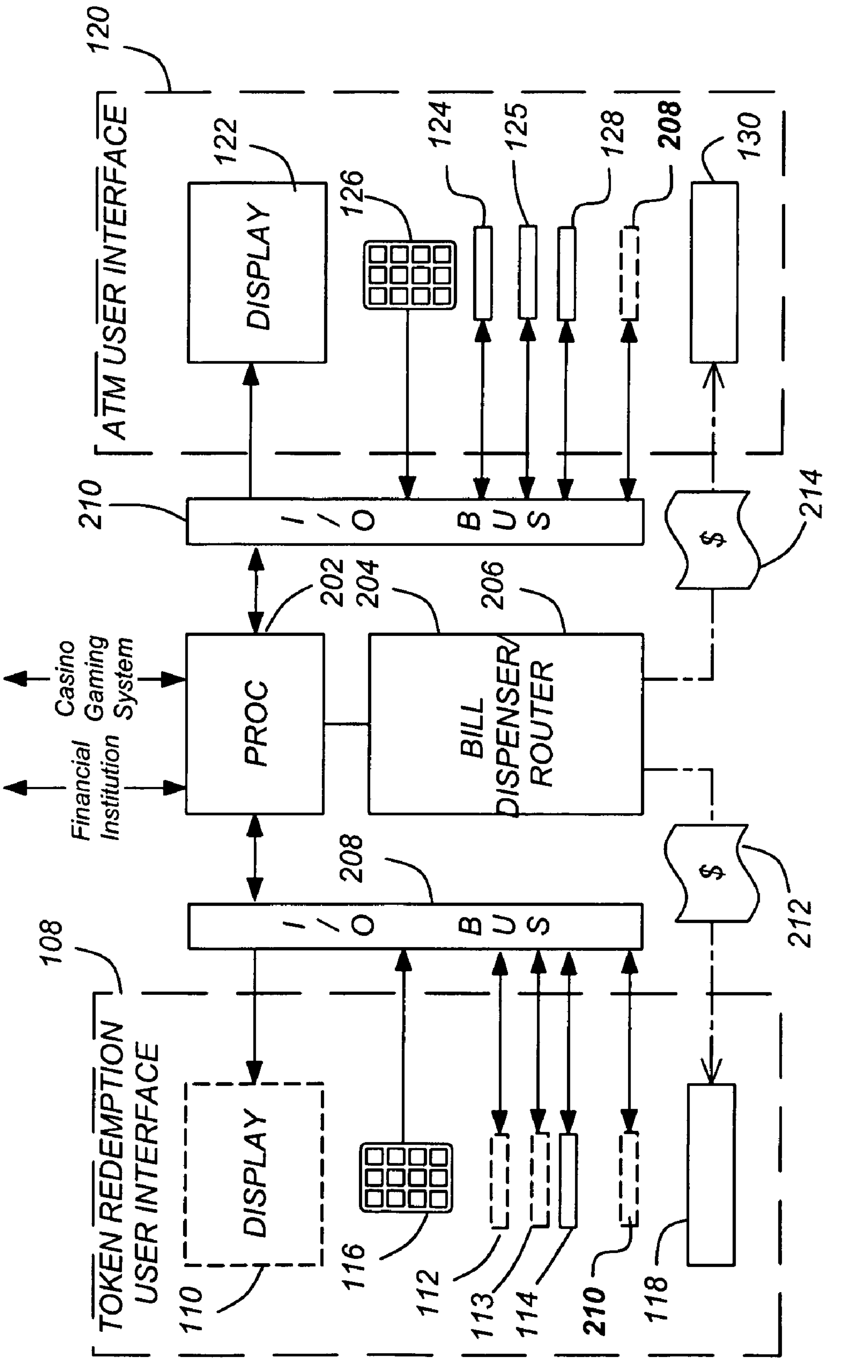
FIG. 2A is a functional block diagram of single processor embodiment of the invention.
Figure 2B:
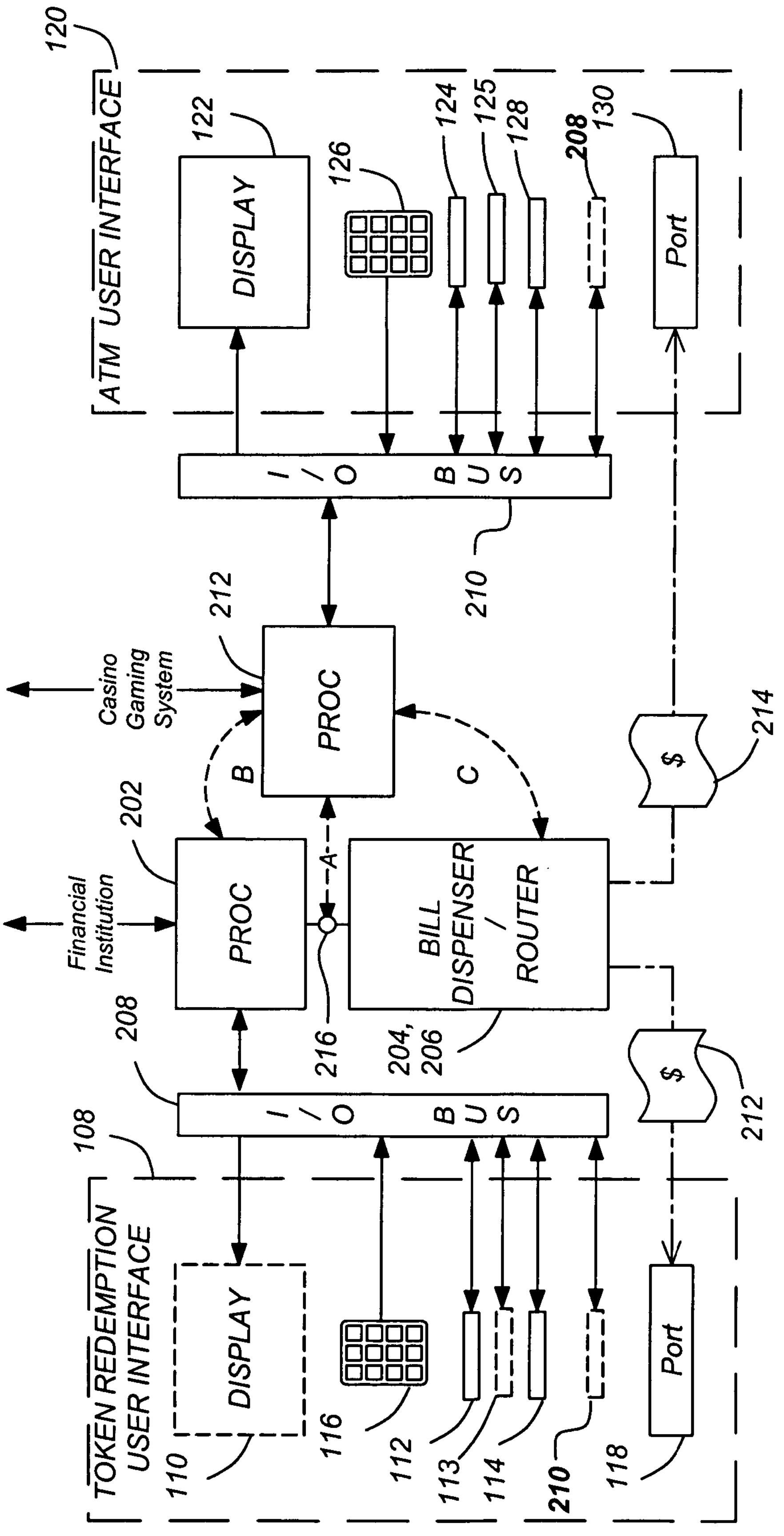
FIG. 2B is a functional block diagram of a double processor embodiment of the invention.

FIGS. 2A and 2B are functional block diagrams of one embodiment of the invention. FIG. 2A is a diagram of a single processor embodiment, while FIG. 2B is a diagram of a dual processor embodiment. Both FIGS. 2A and 2B will be discussed with reference to FIG. 3, which presents exemplary method steps that can be used to practice one embodiment of the invention.

The elements of the ATM user interface 108 and the token redemption user interface 120 described above are coupled to a processor 202 via an input/output bus (I/O) bus. The processor 202 includes built in and or external memory that stores instructions for performing the TRAS 100 functions described herein. In one embodiment, the processor 202 is a processor that is included with a COTS bill dispenser. Hence, the processor 202 is communicatively coupled to a financial institution computer via a dialup or network connection such as the Internet. In another embodiment, the processor 202 is a separate processor that adds functionality not available in the internal COTS bill dispenser.

Figure 3:
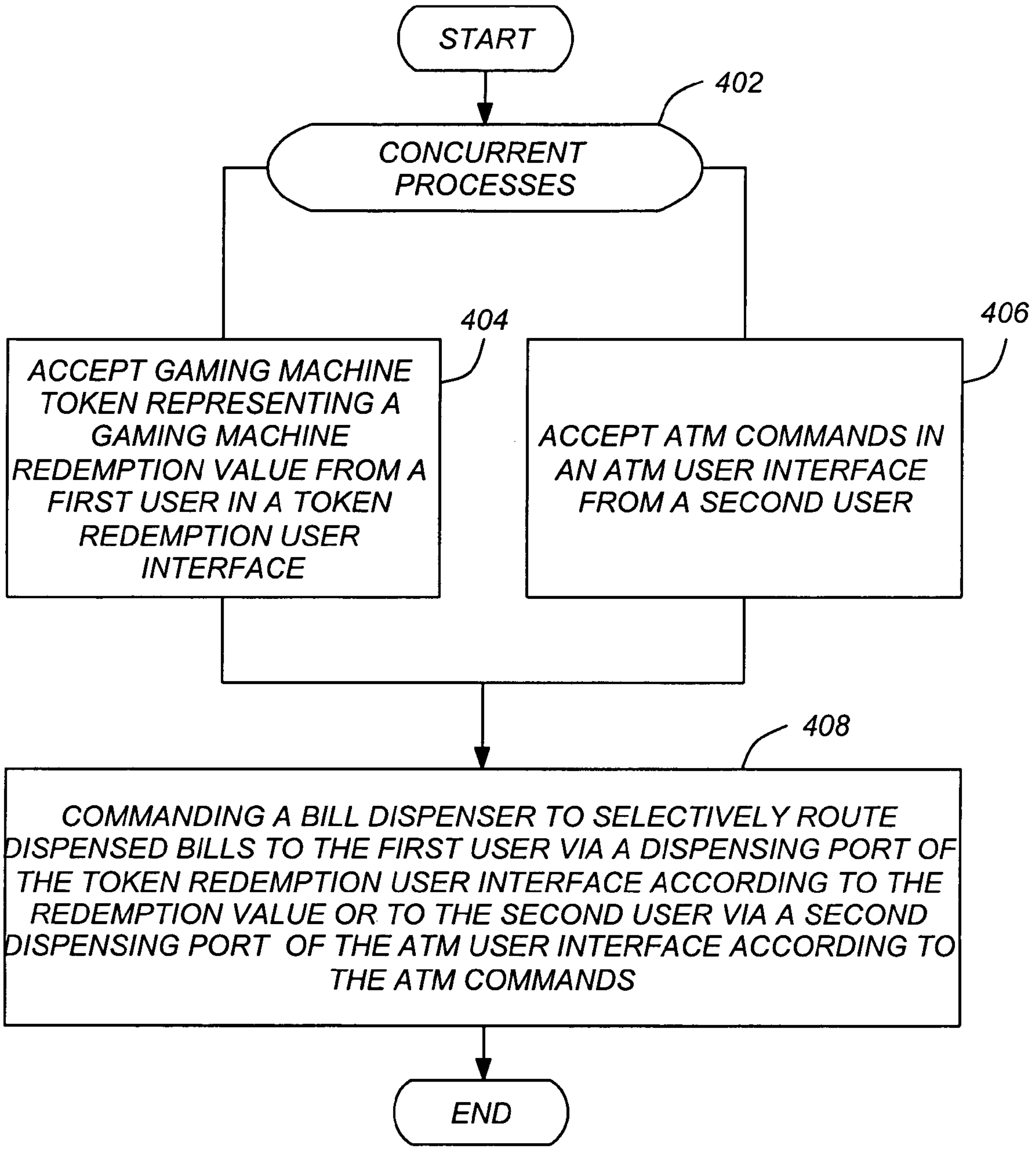
FIG. 3 is a flow chart presenting exemplary method steps for practicing one embodiment of the present invention.

Turning to FIG. 3, block 402 indicates that the processes described in blocks 404 and 406 are concurrent. That is, the operations can take place at the same time. A user 158 approaches the gaming token redemption interface 108, and provides the gaming token to the token acceptor 114. The token acceptor 114 accepts the token, and reads redemption data manifested therein or thereon. The redemption data may also optionally include data to authenticate and/or validate the token, to assure it is genuine and that it truly represents legitimate redemption value. An optional display 112 may provide the user 158 with instructions regarding token 115 redemption and other matters.

The user 158 may not with to redeem all of the value of the token 115. Therefore, in one embodiment of the invention, the display 112 and user input device 116 can be used to specify the monetary amount that the user 158 wishes to redeem from the token 115. The input device 116 can also be used to enter passwords and/or other identifying information.

The redemption data is provided from the token acceptor 114 to the processor 202 via the I/O bus 208. The processor optionally determines whether the token redemption data is valid, and if so, determines the monetary amount to be provided by the user 158. In making this assessment, the processor 202 may be required to obtain additional data from a casino gaming system. This additional data might include the redemption value, other redeemable benefits earned by the user that are not manifested by the token, validation data, and the like.

While the TRAS 100 is performing the operations of block 404, it may also perform the operations depicted in block 406, which include accepting ATM commands in the ATM user interface 120 from the second user 160. Typically, this involves accepting an ATM card from the user in the ATM input device 128. Data read from the ATM card and password input provided by the user input device is provided to the processor 202 via I/O bus 210, and used to validate the identity of the user 160. This is typically accomplished via access to data stored externally at the second user's financial institution. The input device 126 is then used to identify and carry out a transaction, whether it is a deposit, a withdrawal, or a transfer of funds. Should a deposit be selected, the user 160 can enter materials, including cash into the transaction input device 125. The processor 230 accepts inputs and provides commands to the elements of the ATM user interface 120 and the bill dispenser 204 as required to support the ATM functions.

If the appropriate response to the first user 158 or the second user's 160 transaction inputs require the provision of currency in the form of bills, the processor 202 commands the bill dispenser 204 to selectively route dispensed bills to the first user 158 via the first dispensing port 118 and to the second user via the second dispensing port 130. This is shown in block 408. In the illustrated embodiment, this is accomplished by use of the router 206. Depending on the token implementation, the TRAS 100 may modify the gaming token 115 (to reflect the reduced value) and return it to the user 158, store the token 115 in a secure place to for reissue to other users, or destroy the token 115.

In one embodiment of the invention, ATM functionality and token redemption functionality are both available from either the token redemption interface 108 or the ATM user interface 120. This additional functionality is shown in FIG. 2A by dashed lines. For example, the token redemption user interface 108 may include a display 110, an output device 112 for printing receipts, a transaction input device 113 for accepting bills and printed matter, and an ATM input device 210 for accepting ATM cards or smart cards. Similarly, the ATM user interface 120 may include a token acceptor 208 in addition to the other elements shown. This embodiment allows token redemption or ATM service functions to be performed at both surfaces of the TRAS 100.

FIG. 2B is a block diagram of embodiment of the TRAS 100 that uses separate processors for ATM and token redemption functions. In this case, the processor 202 can be dedicated to performing ATM functions alone, and token reimbursement functions are handled by a second processor 212.

This embodiment can be practiced in a number of ways. First, as shown by the dashed line <---C--->, the second processor 212 can be a peer to processor 202, and control the dispensing of bills by providing commands to the bill dispenser 204 separate from those issued by processor 202.

In another embodiment, processor 212 operates by providing commands to processor 202 to perform the required functionality. This embodiment is shown by dashed line <---B--->. In yet another embodiment, a device 216 is inserted between the processor and the bill dispenser.

The device 216 permits processor 212 to monitor and/or interrupt the commands from the first processor 202 to the bill dispenser, and to substitute or provide commands of its own. This embodiment is shown by the dashed line <---A--->. This embodiment is particularly useful, because it permits the required functionality without requiring any modifications to or compatibility problems with processor 202. All that is required is for processor 212 to command the device 216 to disconnect processor 202 from the bill dispenser 204. The second processor 212 is then free to supply commands to the bill dispenser in place of processor 202. In one embodiment, processor 212 also monitors communications on the connection between processor 202 and bill dispenser 204, and times the interruption of those communications so as to minimize any disruptions. In another embodiment, processor 212 not only monitors such communications, but also stores them, especially while the connection between the processor 202 and the bill dispenser 204 is interrupted. That way, any commands that processor 202 sends to the bill dispenser 204 can be sent after the signal interruption has been completed.

Figure 4:
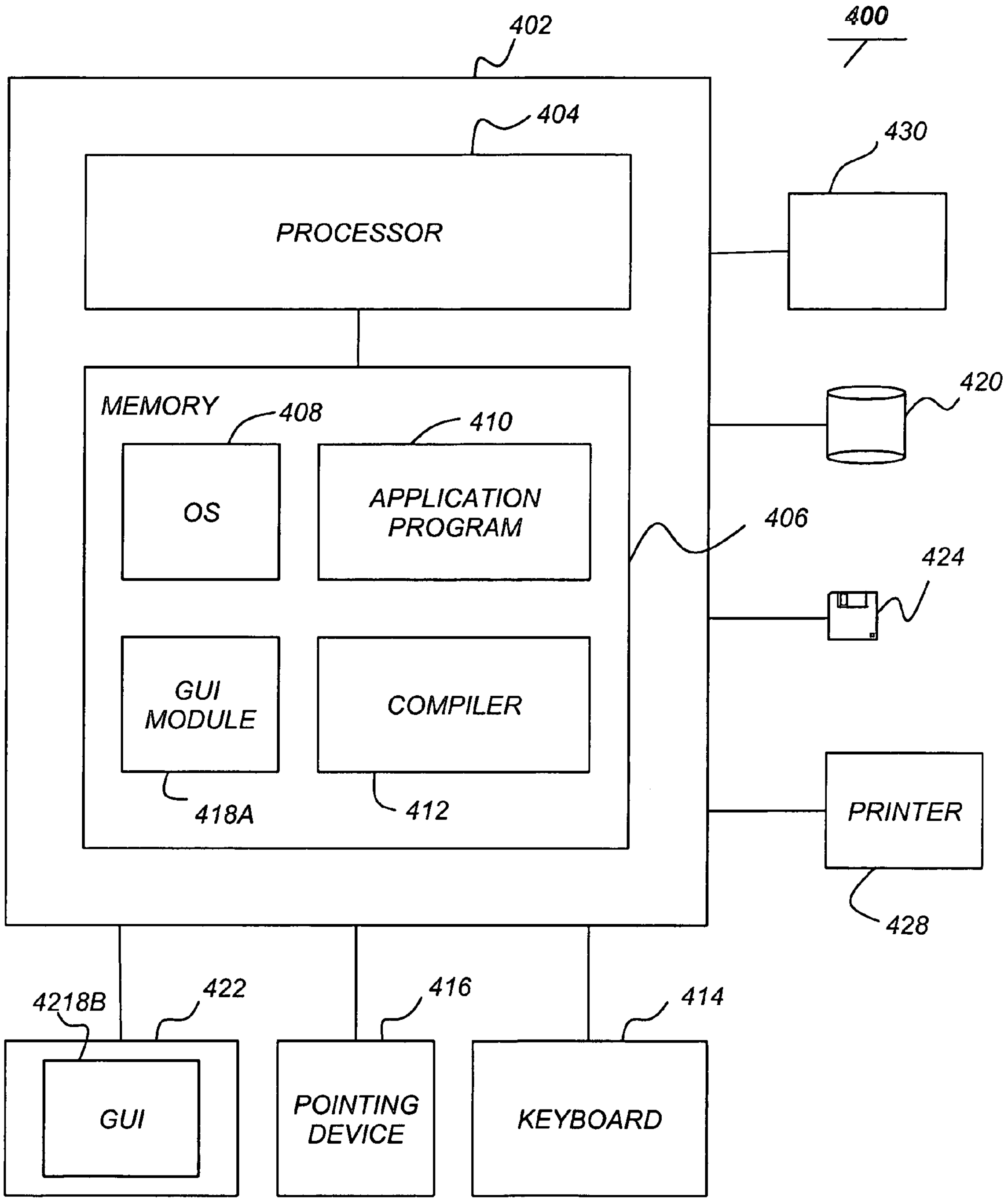
FIG. 4 illustrates an exemplary computer system that could be used to implement elements of the present invention.

FIG. 4 illustrates an exemplary computer system 400 that could be used to implement elements of present invention such as the processors. The computer 402 comprises a processor 404 and a memory, such as random access memory (RAM) 406. The computer 402 is operatively coupled to a display 422, which presents images such as windows to the user on a graphical user interface 418B. The computer 402 may be coupled to other devices, such as a keyboard 414, a mouse device 416, a printer, etc. Of course, those skilled in the art will recognize that any combination of the above components, or any number of different components, peripherals, and other devices, may be used with the computer 402.

Generally, the computer 402 operates under control of an operating system 408 stored in the memory 406, and interfaces with the user to accept inputs and commands and to present results through a graphical user interface (GUI) module 418A. Although the GUI module 418A is depicted as a separate module, the instructions performing the GUI functions can be resident or distributed in the operating system 408, the computer program 410, or implemented with special purpose memory and processors. The computer 402 also implements a compiler 412 which allows an application program 410 written in a programming language such as COBOL, C++, FORTRAN, or other language to be translated into processor 404 readable code. After completion, the application 410 accesses and manipulates data stored in the memory 406 of the computer 402 using the relationships and logic that was generated using the compiler 412. The computer 402 also optionally comprises an external communication device such as a modem, satellite link, Ethernet card, or other device for communicating with other computers.

In one embodiment, instructions implementing the operating system 408, the computer program 410, and the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of instructions which, when read and executed by the computer 402, causes the computer 402 to perform the steps necessary to implement and/or use the present invention. Computer program 410 and/or operating instructions may also be tangibly embodied in memory 406 and/or data communications devices 430, thereby making a computer program product or article of manufacture according to the invention. As such, the terms “article of manufacture,” “program storage device” and “computer program product” as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

For example, while the foregoing illustrations of the TRAS 100 show a kiosk 102 having a polygonal cross section with the token redemption surface 104 and the ATM surface 106 on diametrically opposing sides of the kiosk 102, other embodiments are also possible. For example, it is possible for the kiosk 102 to be “V” shaped with each interface on a side of the “V”, or for the TRAS 102 to present a planar surface having both the token redemption surface 104 and the ATM surface 106 on the same plane. A barrier can be placed between the surfaces 105, 106 if desired to increase transaction privacy. The kiosk may also be circular in cross section.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for concurrent providing automatic teller machine (ATM) and gaming machine token redemption services, comprising:

a token redemption surface having a token redemption user interface including a token acceptor for accepting tokens representing gaming machine redemption values;

an ATM surface, having an ATM user interface;

a bill dispenser disposed between the token redemption surface and the ATM surface, the bill dispenser having a first dispensing port adjacent the token redemption surface and a second dispensing port adjacent the ATM surface and a bill routing system for presenting dispensed bills to either the first dispensing port or the second dispensing port;

a processor, communicatively coupled to the token acceptor and the bill dispensing device, the processor for accepting signals from the token acceptor and for commanding the bill dispenser to dispense bills via the first dispensing port according to the gaming machine redemption values.

2. The apparatus of claim 1, wherein the processor is further coupled to the ATM user interface and the processor accepts signals from the ATM user interface and commands the bill dispenser to dispense bills via the second dispensing port.

3. The apparatus of claim 1, further comprising a second processor coupled to the ATM user interface, the second processor for accepting signals from the ATM user interface and for commanding the bill dispenser to dispense bills via the second dispensing port according to the accepted signals from the ATM interface.

4. The apparatus of claim 3, wherein the first processor is supplied with a commercial off the shelf (COTS) bill dispenser and the second processor is independent from the first processor.

5. The apparatus of claim 4, wherein before commanding the bill dispenser to dispense bills via the second dispensing port, the second processor commands an interruption of commands sent from the first processor to the bill dispenser to dispense bills via the first dispensing port, stores the interrupted commands, and provides the stored interrupted commands to the bill dispenser after commanding the bill dispenser to dispense bills via the first dispensing port.

6. The apparatus of claim 1, wherein:

the ATM surface further comprises a second token redemption user interface having a second token acceptor.

7. The apparatus of claim 6, wherein:

the token redemption surface further comprises a second ATM user interface.

8. The apparatus of claim 1, wherein the token redemption surface and the ATM surface are disposed on diametrically opposite sides of a kiosk.

9. The apparatus of claim 1, wherein the token redemption user interface further comprises a printer for dispensing printed information.

10. The apparatus of claim 1, wherein the token redemption user interface further comprises a keyboard for accepting user input and a display for displaying information to the user.

11. The apparatus of claim 1, wherein the token is selected from a group of token types comprising:

a printed ticket;

a magnetic card;

a smart card;

a flash memory; and a radio frequency identifier (RFID) tagged device.

12. The apparatus of claim 11, wherein:

the token acceptor accepts one of the token types selected from the group; and the token redemption surface further comprises a second token acceptor that accepts a second token of different token type in the group of token types.

13. A method of providing concurrent automatic teller machine (ATM) and gaming token redemption services, comprising the steps of:

concurrently accepting a gaming machine token representing a gaming machine redemption value from a first user in a token redemption user interface and ATM commands from a second user in an ATM user interface; and commanding a bill dispenser to selectively route dispensed bills to the first user via a first dispensing port adjacent the token redemption user interface according to the redemption value or to the second user via a second dispensing port adjacent the ATM user interface according to the ATM commands.

14. The method of claim 13, wherein:

the token redemption user interface comprises a token acceptor; and the step of concurrently accepting gaming machine tokens representing gaming machine redemption values in a token redemption user interface from a first user and ATM commands in an ATM user interface from a second user comprises the steps of:

concurrently accepting the token from the first user in a token acceptor and the ATM commands in the ATM user interface from the second user;

concurrently receiving token information read by the token acceptor in a processor coupled to the token redemption user interface and receiving ATM commands in a second processor coupled to the ATM user interface;

the step of commanding a bill dispenser to selectively route dispensed bills to the first user via a first dispensing port adjacent the token redemption user interface according to the redemption value or to the second user via a second dispensing port adjacent the ATM user interface according to the ATM commands comprises the steps of:

determining the redemption value of the token;

determining a pay out value from the ATM commands;

commanding the bill dispenser to dispense bills via only one of the first dispensing port and the second dispensing port at a time, wherein bills are dispensed to the first user via the first dispensing port according to the determined redemption value and bills are dispensed to the second user via the second dispensing port according to the ATM commands.

15. The method of claim 13, wherein the token redemption user interface and the ATM user interface are disposed on diametrically opposite sides of a kiosk.

16. The method of claim 13, wherein the token redemption user interface and the ATM user interface are disposed on different sides of a kiosk having a polygonal cross section.

17. The method of claim 13, wherein the token is selected from a group of token types comprising:

a printed ticket;

a magnetic card;

a smart card;

a flash memory; and a radio frequency identifier (RFID) tagged device.

18. The method of claim 17, wherein:

the first gaming machine token is one of the token types selected from the group of token types;

the method further comprises the step of:

accepting a second gaming machine token of a different token type in the group of token types, the second gaming machine token representing a second gaming machine redemption value from the first user in the token redemption user interface concurrently with accepting the ATM commands from a second user in the ATM user interface.

19. An apparatus for providing concurrent automatic teller machine (ATM) and gaming token redemption services, comprising:

means for concurrently accepting a gaming machine token representing a gaming machine redemption value in a token redemption user interface from a first user and ATM commands in an ATM user interface from a second user; and means for commanding a bill dispenser to selectively dispense bills to the first user from a first dispensing port adjacent the token redemption user interface according to the redemption value and to the second user from a second dispensing port adjacent the ATM user interface according to the ATM commands.

20. The apparatus of claim 19, wherein:

the token redemption user interface comprises a token acceptor; and the means for concurrently accepting gaming machine tokens representing gaming machine redemption values in a token redemption user interface from a first user and ATM commands in an ATM user interface from a second user comprises:

means for concurrently accepting the token from the first user in a token acceptor and the ATM commands in the ATM user interface from the second user; and means for concurrently receiving token information read by the token acceptor in a processor coupled to the token redemption user interface and receiving ATM commands in a second processor coupled to the ATM user interface;

the means for commanding a bill dispenser to selectively dispense bills to the first user from a first dispensing port adjacent the token redemption user interface according to the redemption value and to the second user from a second dispensing port adjacent the ATM user interface according to the ATM commands comprises:

means for determining the redemption value of the token;

means for determining a pay out value from the ATM commands;

means for commanding the bill dispenser to dispense bills via only one of the first dispensing port and the second dispensing port at a time, wherein bills are dispensed to the first user via the first dispensing port according to the determined redemption value and bills are dispensed to the second user via the second dispensing port according to the ATM commands.

21. The apparatus of claim 19, wherein the token redemption user interface and the ATM user interface are disposed on diametrically opposite sides of a kiosk.

22. The apparatus of claim 19, wherein the token redemption user interface and the ATM user interface are disposed on different sides of a kiosk having a polygonal cross section.

23. The apparatus of claim 19, wherein the token is selected from the group comprising:

a printed ticket;

a magnetic card;

a smart card;

a flash memory; and a radio frequency identifier (RFID) tagged device.

24. The apparatus of claim 19, wherein:

the first gaming machine token is one of the token types selected from the group of token types;

the apparatus further comprises:

means for accepting a second gaming machine token of a different token type in the group of token types, the second gaming machine token representing a second gaming machine redemption value from the first user in the token redemption user interface concurrently with accepting the ATM commands from a second user in the ATM user interface.

* * * * *